(12) United States Patent
Mast et al.

(10) Patent No.: US 7,147,414 B2
(45) Date of Patent: Dec. 12, 2006

(54) SPUR POINT DRILL INSERT

(75) Inventors: Wendell E. Mast, Dundee, OH (US); Brian Keim, Dover, OH (US)

(73) Assignee: Allied Machine & Engineering Corp., Dover, OH (US)

( * ) Notice: Subject to any disclaimer, the term of this patent is extended or adjusted under 35 U.S.C. 154(b) by 401 days.

(21) Appl. No.: 10/465,390

(22) Filed: Jun. 19, 2003

(65) Prior Publication Data

US 2004/0001741 A1    Jan. 1, 2004

Related U.S. Application Data

(60) Provisional application No. 60/391,797, filed on Jun. 27, 2002.

(51) Int. Cl.
*B23B 51/02* (2006.01)

(52) U.S. Cl. .................. 408/225; 408/227; 408/233; 408/713

(58) Field of Classification Search ............. 408/223, 408/224, 225, 227, 230, 231, 233, 713
See application file for complete search history.

(56) References Cited

U.S. PATENT DOCUMENTS

| 1,047,466 | A |   | 12/1912 | Wagner |   |
|---|---|---|---|---|---|
| 2,360,385 | A |   | 10/1944 | Anderson |   |
| 2,621,548 | A |   | 12/1952 | Williams |   |
| 2,782,824 | A | * | 2/1957 | Robinson | 408/223 |
| 3,779,664 | A | * | 12/1973 | Caley et al. | 408/225 |
| 3,997,279 | A | * | 12/1976 | Porter | 408/211 |
| 4,286,904 | A | * | 9/1981 | Porter et al. | 408/225 |
| 4,342,368 | A | * | 8/1982 | Denman | 175/420.1 |
| 4,565,473 | A |   | 1/1986 | Hosoi |   |
| 4,682,917 | A | * | 7/1987 | Williams et al. | 408/212 |
| 4,744,704 | A |   | 5/1988 | Galvefors |   |
| 4,878,788 | A | * | 11/1989 | Wakihira et al. | 408/230 |
| 4,984,944 | A | * | 1/1991 | Pennington et al. | 408/223 |
| 5,286,143 | A | * | 2/1994 | Schimke | 408/211 |
| 5,288,183 | A | * | 2/1994 | Chaconas et al. | 408/211 |
| 5,452,970 | A | * | 9/1995 | Sundstrom et al. | 408/211 |
| 5,474,407 | A |   | 12/1995 | Rodel et al. |   |
| 5,570,978 | A |   | 11/1996 | Rees et al. |   |
| 5,957,635 | A | * | 9/1999 | Nuzzi et al. | 408/231 |
| 6,102,634 | A | * | 8/2000 | Turner et al. | 408/224 |

(Continued)

FOREIGN PATENT DOCUMENTS

DE        3123048 A  *  8/1982

(Continued)

OTHER PUBLICATIONS

Allied Machine & Engineering Corp., "2003 T-A Drilling System —Drill Inserts and Holders —Inch and Metric," Catalog No. 2003USTAC, p. 3 pages, (Aug. 2, 2003).

(Continued)

*Primary Examiner*—Daniel W. Howell
*Assistant Examiner*—Michael W. Talbot
(74) *Attorney, Agent, or Firm*—Hahn Loeser & Parks, LLP; Robert J. Clark

(57) ABSTRACT

A cutting tool insert having a specialized spur point geometry at the center of the insert. The insert comprises a spur point cutting portion and a blade cutting portion wherein the spur point provides stability by providing a spot and allowing a flexible workpiece to partially spring back when the spur breaks through. The spur point insert facilitates the cutting of relatively thinner workpieces and workpieces requiring the tool to have a longer reach to the hole, while minimizing the burr resulting from the drilling operation.

19 Claims, 3 Drawing Sheets

U.S. PATENT DOCUMENTS

| | | | |
|---|---|---|---|
| 6,135,681 A | 10/2000 | Nuzzi et al. | |
| 6,227,774 B1 * | 5/2001 | Haughton et al. | 408/225 |
| 6,312,432 B1 * | 11/2001 | Leppelmeier | 606/80 |
| 6,371,702 B1 * | 4/2002 | DeWald et al. | 408/227 |
| 6,629,805 B1 * | 10/2003 | Eischeid | 408/228 |
| 6,685,402 B1 * | 2/2004 | Mast et al. | 408/227 |
| 6,902,359 B1 * | 6/2005 | Kraemer | 408/229 |
| 6,957,937 B1 * | 10/2005 | Vasudeva | 408/211 |
| 2003/0077134 A1 * | 4/2003 | Moser et al. | 408/231 |
| 2004/0151553 A1 * | 8/2004 | George et al. | 408/230 |
| 2005/0025595 A1 * | 2/2005 | Binder et al. | 408/233 |

FOREIGN PATENT DOCUMENTS

| | | | |
|---|---|---|---|
| FR | 2540424 A | | 8/1984 |
| JP | 54039290 A | * | 3/1979 |
| JP | 56015907 A | * | 2/1981 |
| JP | 10109210 A | * | 4/1998 |
| JP | 10328918 A | * | 12/1998 |
| SU | 1776497 A1 | | 11/1992 |

OTHER PUBLICATIONS

Allied Machine & Engineering Corp., "Drilling and cutting tools including spade drills, drill inserts and holders (http://www.alliedmachine.com/ProductInfo/SpecialProd2.cfm)," printed from Internet, p. 2 pages, (Oct. 2, 2003).

Allied Machine & Engineering Corp., "Exclusive Structural Steel T/A Drilling System," Literature No. SS-02, p. 6 pages.

PCT International Search Report for International Application No. PCT/US03/19377 Oct. 15, 2003.

* cited by examiner

SPUR POINT DRILL INSERT

TECHNICAL FIELD

This application claims the benefit of U.S. Provisional Application Ser. No. 60/391,797 filed Jun. 27, 2002, hereby incorporated by reference. The present invention relates generally to a cutting insert to be placed into a tool holder for boring holes into metals. More specifically, the invention relates to a cutting tool insert having a specialized spur point geometry at the center of the insert which facilitates the cutting of workpieces, for example, relatively thinner workpieces and workpieces that are at a distance from the cutting machine.

BACKGROUND OF THE INVENTION

Drilling systems are frequently used to provide cylindrical holes in metallic workpieces. The cutting or boring action of the drill system may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tail stock of a lathe or the like. Further, the tool and workpiece may be made to rotate relative to one another. The use of cutting inserts allows for quick changing of the insert upon wear of the cutting surfaces instead of the entire tool, and allows for one tool to be used for a variety of different boring applications by simply changing the insert and not the entire drill assembly.

However, one particular application which provides problems for prior art cutting tools involves drilling holes through the web portion of structural steel I beams, for example. The flanges of the I-beam require the tool to reach a significant distance to the web of the I-beam. The reach distance can cause a severe instability problem for the tool when attempting to cut a hole through the web. As a result, the tool may wobble or "walk" resulting in an oversize hole, run-out, bellmouthing, and/or an off location hole. Another problem is that the web in these applications are typically relatively thin. During the drilling process, the drill pressure pushes against the thin wall of material allowing it to deflect. As the tool breaks through the material, the material snaps back to its original position, resulting in an irregular shaped hole. Still another problem presented by this and similar applications is that a large burr is produced on the backside of the material. As the tool breaks through the material, the built up drilling pressure causes the tool to lunge through the drilled hole which results in the creation of a burr on the backside of the material. This typically requires an added de-burring process to the machining operation in order to remove the burr. In applications such as with structural steel it is critical that not only the hole be round, but that there is no burr to interfere between the register surfaces of beams and connector plates which must lay flat when they are being connected. A burr can result in an improper connection length and also decrease the strength of the connection by preventing a proper preload of the fastener used to connect the beams.

SUMMARY OF THE INVENTION

The present invention provides a spur point insert for a drilling tool which has increased stability and reduces tool lunge on break through. These and other advantages of the present invention are provided by a drill insert comprising a drill insert body having at least a first side and a second side, wherein the second side comprises a first cutting portion formed on a first insert diameter and a second cutting portion formed on a second insert diameter, wherein the first cutting portion comprises at least two cutting edges forming a primary included angle and wherein the cutting edges of the first cutting portion extend from opposite ends of a chisel point to the first insert diameter, wherein the second cutting portion comprises at least two cutting edges forming a secondary angle, wherein the cutting edges of the second cutting portion extend from the first insert diameter to the second insert diameter, wherein the first cutting portion comprises at least two web thin grooves formed transverse to each other, each of the at least two web thin grooves are formed in one of the connection surfaces adjacent to the cutting edges of the first cutting portion, each web thin groove having a trough, the trough being generally parallel to the cutting edge of the first cutting portion.

These and other advantages of the present invention are also provided by a drilling tool assembly comprising a holder having first and second ends and a rotational axis, wherein the second end is adapted to be fixedly attached in a drilling machine, and the first end comprises a holder slot having a bottom seating surface over at least a portion of the holder slot, the holder slot also including a locating boss extending from the bottom seating surface; and a drill insert body having at least a first side and a second side, wherein the first side of the drill body comprises a generally planar surface, wherein the second side comprises a first cutting portion formed on a first insert diameter and a second cutting portion formed on a second insert diameter, wherein the first cutting portion comprises at least two cutting edges forming a primary included angle and wherein the cutting edges of the first cutting portion extend from opposite ends of a chisel point to the first insert diameter, wherein the second cutting portion comprises at least two cutting edges forming a secondary angle, wherein the cutting edges of the second cutting portion extend from the first insert diameter to the second insert diameter, wherein the first cutting portion comprises at least two web thin grooves formed transverse to each other, each of the at least two web thin grooves are formed in one of the connection surfaces adjacent to the cutting edges of the first cutting portion, each web thin groove having a trough, the trough being generally parallel to the cutting edge of the first cutting portion, and wherein the first side is adapted to have at least a portion thereof positioned in the holder slot in seating engagement with the bottom seating surface and including a locating slot formed in the first side of the drill insert body which cooperates with the locating boss of the bottom seating surface to allow the insert to be seated against the bottom seating surface.

BRIEF DESCRIPTION OF THE DRAWINGS

The invention and developments thereof are described in more detail in the following by way of embodiments with reference to the drawings, in which.

DETAILED DESCRIPTION OF THE INVENTION

Figure 1:
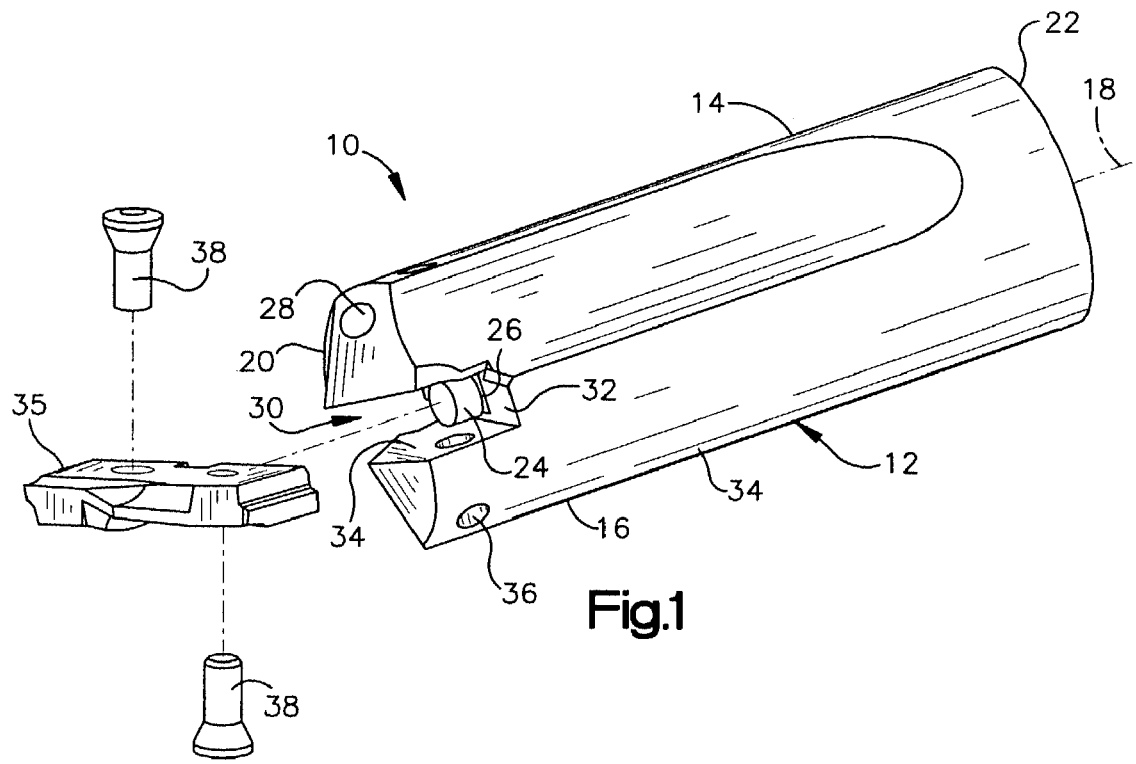
FIG. 1 is an exploded assembly view of the drill tool assembly according to a preferred embodiment.
Figure 2:
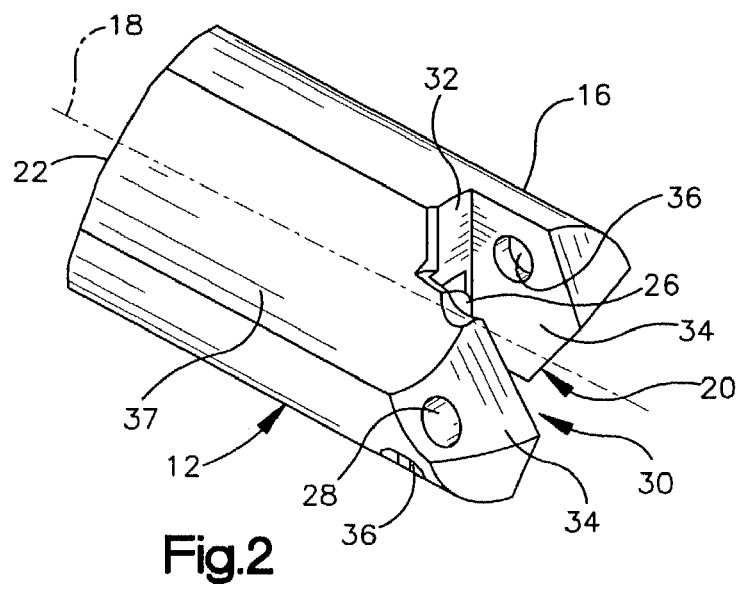
FIG. 2 is a partial perspective view of the holder associated with the assembly.
Figure 3A:
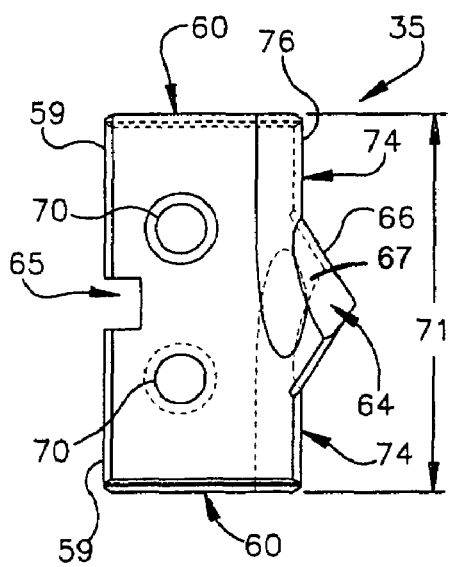
FIGS. 3A–3D are a variety of different views of an insert according to a first embodiment of the present invention having a 180 degree secondary included angle.
Figure 3B:
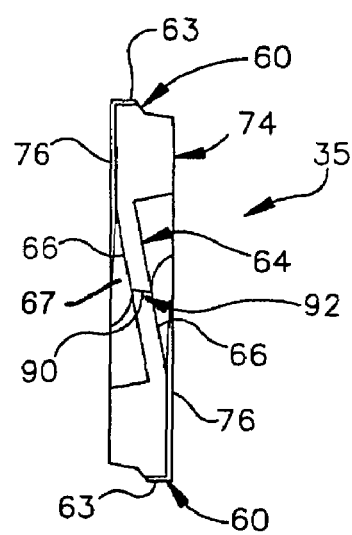
Figure 3C:
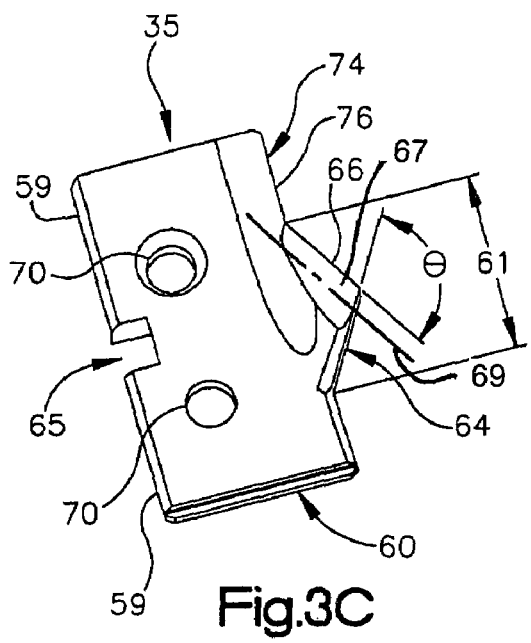
Figure 3D:
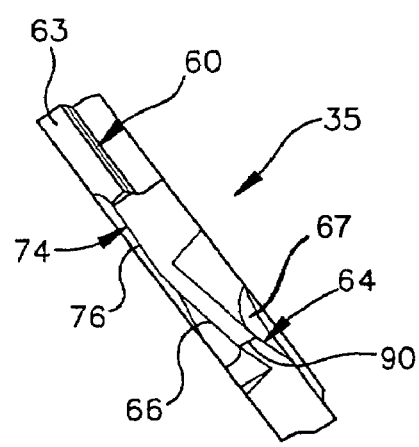
Figure 4A:
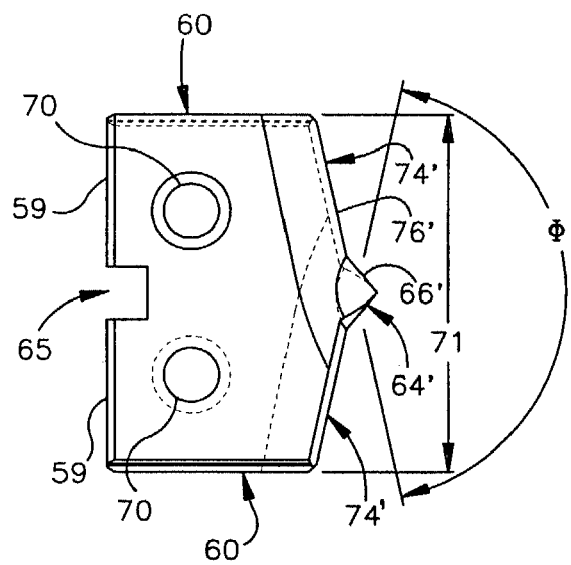
FIGS. 4A–4D are a variety of different views of an insert according to a second embodiment of the present invention having a secondary included angle less than 180 degrees.
Figure 4B:
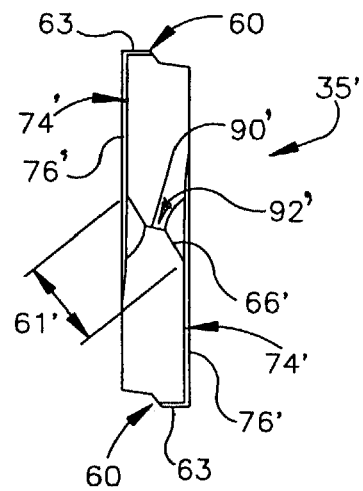
Figure 4C:
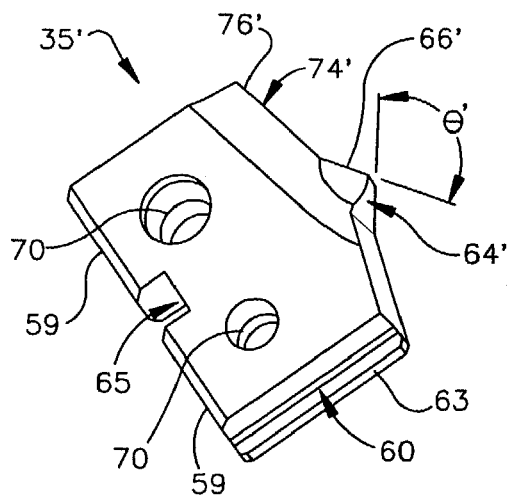
Figure 4D:
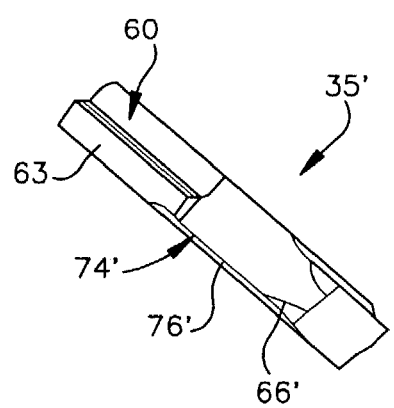

Turning now to a preferred embodiment of the invention, FIG. 1 illustrates a drill tool assembly 10 generally indicated. Drill tool assembly 10 comprises a holder 12, which has a body 14 and head portion 16 associated therewith. In the preferred embodiment, holder 12 has, in general, a cylindrical shape with a first end 20 and second end 22. As shown in FIG. 2, the first end 20 of holder 12 has a clamping or holder slot 30, which may extend across the entire diameter of the head portion 16 or, at least, over a center portion thereof at the general location of the rotational axis 18 of holder 12. The holder slot 30 has a bottom wall 32 positioned in substantially perpendicular orientation relative to the rotational axis 18 of the holder 12. In the preferred embodiment, the assembly 10 may further include a locating boss or dowel pin 24, which is positioned precisely with respect to the axis 18 and extends from the bottom wall 32 of the holder slot 30. The pin 24 may be positioned within a hole 26 extending downwardly from the bottom wall 32 of slot 30 along the axis 18 of the holder body in a press fit relationship to position pin 24. Alternatively, the locating boss, which, in the preferred embodiment, comprises pin 24, may be configured in another manner to achieve the corresponding functionality of pin 24, such as an integral member extending from bottom wall 32. Within the holder slot 30, a drill insert 35 is precisely positioned with respect to the holder 12 to perform the desired drilling function in conjunction therewith. As will be hereinafter described in more detail, the insert 35 has a spur point geometry comprising a plurality of cutting surfaces, which are precisely positioned with respect to the axis 18 of the holder 12 to minimize errors in a resulting drilling operation using assembly 10.

More particularly, the preferred embodiment of holder 12 is shown in FIG. 2, and may be configured to include at its first end 20 a pair of clamping arms 34, which extend about holder slot 30. The clamping arms 34 preferably include apertures 36, which accommodate screws 38 (see FIG. 1) to secure the drill insert 35 in its position within the holder slot 30. In the preferred configuration, the holes 36 are threaded to engage screws 38, and mate with screw holes formed in the drill insert 35 in a predetermined manner to precisely locate the drill insert in a predetermined location within holder slot 30, as will be described in more detail. Each of the clamp arms 34 may also include a lubrication vent 28, which allows the application and flow of lubrication adjacent the cutting surfaces of the drill insert to facilitate the drilling operation. The clamp arms 34 may also include angled or curved surfaces, which facilitate chip removal via chip evacuating grooves 37 on each side of the holder 12. The seating surface 32 is also shown to be designed as a planar surface, which corresponds to the planar bottom portion of the preferred drill insert 35, although another configuration of bottom surface 32 may be employed and is contemplated herein.

Turning to FIGS. 3A–3D, a first embodiment of the spur point drill insert 35 is shown. The spur point drill insert 35 is a spade-type drill blade, with side edges 60 including margins 63 of the blade being generally parallel with the rotational axis 18 of the holder 12 once the insert 35 is positioned and secured with holder 12. When secured with holder 12, drill insert 35 will also have a rotational axis, which desirably is coaxial with axis 18 of holder 12. The drill insert 35 will also have a width 71, which, upon being rotated with holder 12, forms an outside diameter 71 of the assembled tool. The drill insert 35 comprises a first spur cutting portion 64 having a minor diameter or spur diameter 61 and a second blade cutting portion 74 having a major diameter or blade diameter equivalent to the insert width 71.

The spur cutting portion 64 includes cutting edges 66 on its upper surface in the form of a V-shape having a first or primary included angle $\theta$. Cutting edges 66 are formed on parallel planes on opposite sides of the drill insert 35 and extend generally radially inward and terminate on opposite ends of a chisel 90 formed across the web 92 of the insert 35. The cutting edges 66 extend along parallel planes generally radially outward to the spur diameter 61. Web thin grooves 67 are shown adjacent to the cutting edges 66. The web thin grooves 67 are oriented such that a trough 69 of each web thin groove 67 is generally parallel to the adjacent cutting edge 66. The web thin grooves 67 are formed at a depth increasing from the first insert diameter 61 toward the chisel point 92. For most applications, the best performance is achieved when the spur diameter 61 is generally half to one fourth the size of the blade diameter 71. However, it is contemplated that other ratios may also be used and the spur diameter 61 is not intended to be limited to any particular ratio with respect to the blade diameter 71.

The second blade cutting portion 74 includes cutting edges 76 on its upper surface. Grooves are shown adjacent to the cutting edge 76. The grooves are oriented such that a trough of each groove is generally parallel to the adjacent cutting edge 76. The grooves are formed at a constant depth at least along the length of the cutting edges 76. Cutting edges 76 may either be perpendicular to the rotational axis and having a 180 degree angle as shown in FIGS. 3A–3D or in the form of a V-shape having a second or secondary included angle $\Phi$ as shown in FIGS. 4A–4D. Cutting edges 76 are formed on parallel planes on opposite sides of the drill insert 35 and extend generally radially outward from the spur diameter 61 to the blade diameter 71.

The cutting edges 66, 76 may include a plurality of cutting components, which cooperate together to provide the desired cutting surface 66 for the material and/or drilling application. These cutting components may include, but are not limited to, chip breakers, corner clip, corner radius, edge treatments, etc.

In general, the insert 35 is designed to cut when rotationally driven in conjunction with holder 12 in a predetermined direction, and is not reversible, although such drilling blade configurations are known to those skilled in the art and could be used in conjunction with the present invention if desired. The drill insert 35 further preferably includes apertures 70, which cooperate with the apertures 36 in clamp arms 34 to secure insert 35 within holder slot 30 and seated against seating surface 32. Additionally, each of the apertures 36 and 70 are preferably formed with countersunk portions formed as a bearing surface adapted to be engaged by a corresponding tapered or like surface on the screws or other fastening mechanism 38. The enlarged clamping head of the screws 38 may be of any convenient shape, such as conical, ball-shaped, or in another form to correspond with the similar surfaces in the tool holder 12 and insert 35. In a typical fashion, by offsetting the axes of the apertures 36 and 70, upon securing insert 35 within slot 30 by means of screws 38, the planar bottom portion 59 of insert 35 will be forced downwardly against the seating surface 32. Insert 35 may include a locating slot 65, which allows positioning of the locating pin 24 therein. This connection is further described in co-owned U.S. Pat. No. 5,957,635, which is herein incorporated by reference.

In operation, the spur cutting portion 64, or spur, aggressively engages the material to be cut and helps center the tool during the initial cut. As the spur 64 is formed at a minor diameter 61 or spur diameter that is smaller than the major diameter 71 or width of the cutting tool 10, there is less deflection of the workpiece when the spur 64 is engaged. When the spur 64 breaks through the opposite side of the workpiece, a significant portion of the built up drill pressure is released. In addition, the margins 63 of the drill insert 35 are typically fully engaged with the material hole diameter at the time when the spur 64 breaks through the opposite side of the workpiece which provides additional stability to the cutting operation. Therefore the stability of the cutting tool 10 is retained and the secondary or blade cutting edges 76 are in effect milling the remaining workpiece material in the hole. The reduction of built up drill pressure also results in a significant reduction of lunge upon completion of drilling the hole, resulting in a minimization of the creation of unacceptable burrs.

Turning to FIGS. 4A–4D, a second embodiment of the spur point drill insert 35' is shown. Drill insert 35' is similar to drill insert 35 except that drill insert 35' comprises a second blade cutting portion 74' having a secondary included angle Φ which is less than 180 degrees and the spur diameter 61' is about a fourth the size of the blade diameter 71.

It is contemplated that the drill insert 35, 35' is made of a sintered metallic hard material such as carbide, cermet, ceramic, monocrystalline and polycrystalline diamond, or boron nitride. However, the drill insert may also be comprised of high speed steel.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A drill insert comprising:
   a drill insert body comprising a first end, a second end, a pair of connection surfaces formed generally parallel to each other on opposite sides of the drill insert body, and a pair of margins extending from the first end to the second end;
   wherein the second end comprises a first cutting portion formed on a first insert diameter and a second cutting portion formed on a second insert diameter generally corresponding to the outside diameter of the drill insert body,
   wherein the first cutting portion comprises at least two cutting edges forming a primary included angle and wherein the cutting edges of the first cutting portion extend from opposite ends of a chisel point to the first insert diameter,
   wherein the second cutting portion comprises at least two cutting edges forming a secondary angle, wherein the cutting edges of the second cutting portion are adjacent to and form a continuous cutting edge with the cutting edges of the first cutting portion, and wherein the cutting edges of the second cutting portion extend from the first insert diameter to the second insert diameter;
   a plurality of grooves formed in the connection surfaces, each groove adjacent each cutting edge, each groove having a groove trough parallel to the corresponding adjacent cutting edge, the grooves of the second cutting portion being formed at a constant depth at least along the length of the cutting edges of the second cutting portion, the grooves of the first cutting portion being formed at a depth increasing from the first insert diameter toward the chisel point.

2. The drill insert of claim 1, wherein the at least two cutting edges of the first cutting portion are formed transverse to each other on parallel planes.

3. The drill insert of claim 1, wherein the at least two cutting edges of the second cutting portion are formed transverse to each other on parallel planes.

4. The drill insert of claim 1 further comprising an aperture formed through the drill insert body.

5. The drill insert of claim 1 further comprising a plurality of apertures formed through the drill insert body.

6. The drill insert of claim 1, wherein the secondary angle is an included angle less than 180 degrees.

7. The drill insert of claim 1, wherein the secondary angle is generally 180 degrees.

8. The drill insert of claim 1, wherein the drill insert body is comprised of a sintered metallic hard material.

9. The drill insert of claim 1, wherein the drill insert body is comprised of a material selected from the group consisting of carbide, cermet, ceramic, monocrystalline and polycrystalline diamond, and boron nitride.

10. The drill insert of claim 1, wherein the drill insert body is comprised of high speed steel.

11. A drilling tool assembly comprising:
    a holder having first and second ends and a rotational axis, wherein the second end is adapted to be fixedly attached in a drilling machine, and the first end comprises a holder slot having a bottom seating surface over at least a portion of the holder slot, the holder slot also including a locating boss extending from the bottom seating surface;
    a drill insert body comprising a first end, a second end, a pair of connection surfaces formed generally parallel to each other on opposite sides of the drill insert body, and a pair of margins extending from the first end to the second end and forming an outside diameter of the drill insert body;
    wherein the first end of the drill insert body comprises a generally planar surface having at least one recess formed in the first end,
    wherein the second end of the drill insert body comprises a first cutting portion formed on a first insert diameter and a second cutting portion formed on a second insert diameter generally corresponding to the outside diameter of the drill insert body,
    wherein the first cutting portion comprises at least two cutting edges forming a primary included angle and wherein the cutting edges of the first cutting portion extend from opposite ends of a chisel point to the first insert diameter,
    wherein the second cutting portion comprises at least two cutting edges forming a secondary angle, wherein the cutting edges of the second cutting portion are adjacent to and form a continuous cutting edge with the cutting edges of the first cutting portion, and wherein the cutting edges of the second cutting portion extend from the first insert diameter to the second insert diameter;
    a plurality of grooves formed in the connection surfaces of the drill inset body, each groove adjacent each cutting edge, each groove having a groove trough parallel to the corresponding adjacent cutting edge, the grooves of the second cutting portion being formed at a constant depth at least along the length of the cutting edges of the second cutting portion, the grooves of the first cutting portion being formed at a depth increasing from the first insert diameter toward the chisel point; and wherein the first end of the drill insert body is adapted to have at least a portion thereof positioned in the holder slot in seating engagement with the bottom seating surface and including a locating slot formed in the first end of the drill insert body which cooperates with the locating boss of the bottom seating surface to allow the insert to be seated against the bottom seating surface.

12. The drilling tool assembly of claim 11, wherein the secondary angle is an included angle less than 180 degrees.

13. The drilling tool assembly of claim 11, wherein the secondary angle is generally 180 degrees.

14. The drilling tool assembly of claim 11, wherein the at least two cutting edges of the first cutting portion are formed transverse to each other on parallel planes.

15. The drilling tool assembly of claim 11, wherein the at least two cutting edges of the second cutting portion are formed transverse to each other on parallel planes.

16. The drilling tool assembly of claim 11 further comprising a plurality of apertures formed through the pair of connection surfaces of the drill insert body.

17. The drilling tool assembly of claim 16 further comprising a plurality of fasteners, wherein one fastener of the plurality of fasteners is positioned through each aperture of the plurality of apertures to secure the drill insert body to the holder.

18. The insert of claim 1, wherein the first end of the drill insert body comprises a generally planar surface having at least one recess formed in the first end.

19. A drill insert comprising:

a drill insert body comprising a first end, a second end, a pair of connection surfaces formed generally parallel to each other on opposite sides of the drill insert body, and a pair of margins extending from the first end to the second end and forming an outside diameter of the drill insert body;

wherein the second end comprises a first cutting portion formed on a first insert diameter and a second cutting portion formed on a second insert diameter generally corresponding to the outside diameter of the drill insert body, wherein the first cutting portion comprises at least two cutting edges forming a primary included angle and wherein the cutting edges of the first cutting portion extend from opposite ends of a chisel point to the first insert diameter, wherein the second cutting portion comprises at least two cutting edges forming a secondary angle, wherein the cutting edges of the second cutting portion are adjacent to and form a continuous cutting edge with the cutting edges of the first cutting portion, and wherein the cutting edges of the second cutting portion extend from the first insert diameter to the second insert diameter;

wherein the first cutting portion comprises at least two web thin grooves formed transverse to each other, each of the at least two web thin grooves are formed in one of the connection surfaces adjacent to the cutting edges of the first cutting portion, each web thin groove having a web thin trough, the web thin trough being generally parallel to the cutting edge of the first cutting portion, wherein the depth of the web thin groove with respect to the connection surface increases from the first insert diameter toward the chisel, and wherein each web thin groove of the first cutting portion extends generally from the chisel and terminates at the first insert diameter.

* * * * *